Dec. 6, 1949 J. H. KOCH 2,490,690
METHOD FOR CONSTRUCTING TRAINING MOCK-UP
Filed June 14, 1948 4 Sheets-Sheet 1
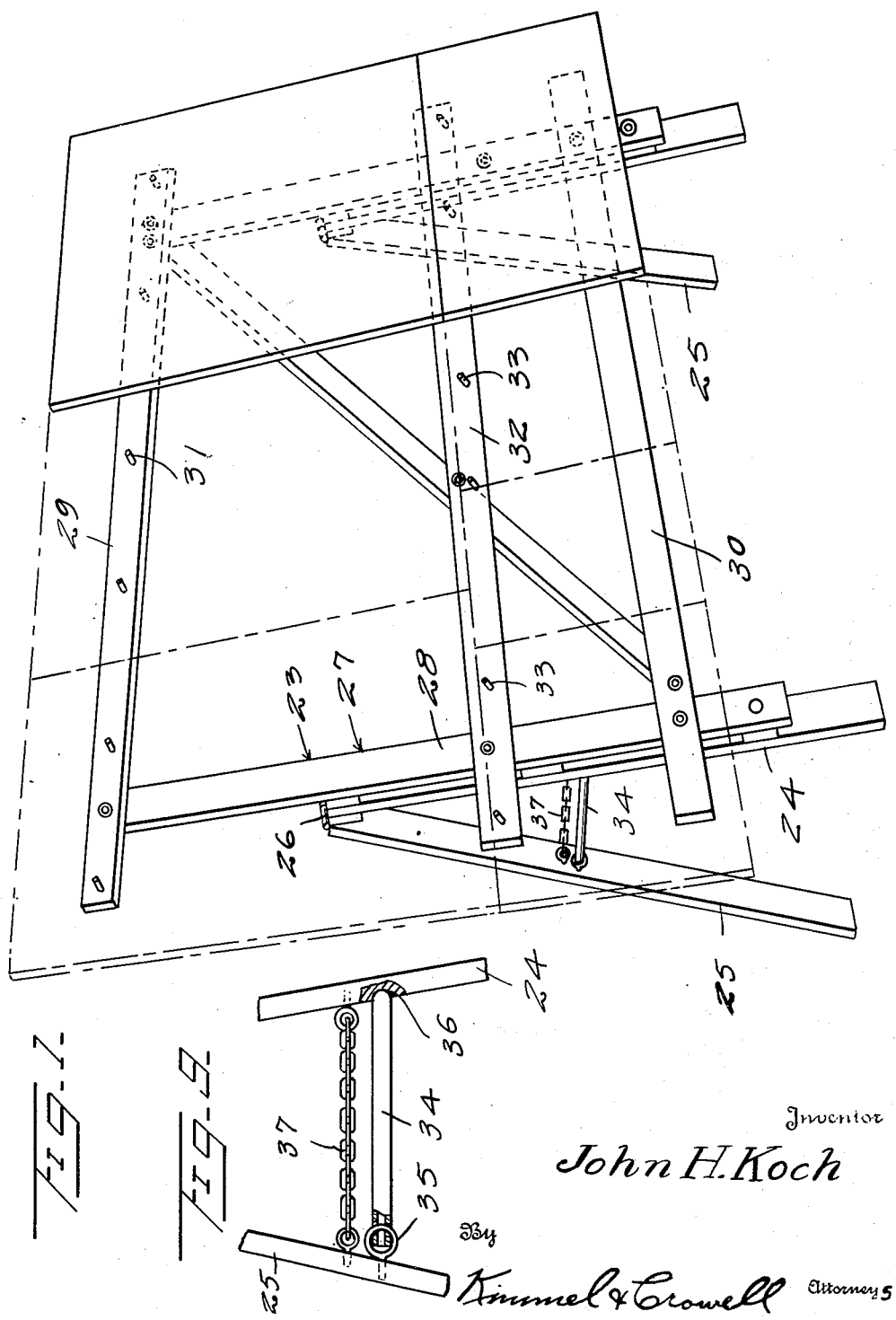

Dec. 6, 1949 J. H. KOCH 2,490,690
METHOD FOR CONSTRUCTING TRAINING MOCK-UP
Filed June 14, 1948 4 Sheets-Sheet 2
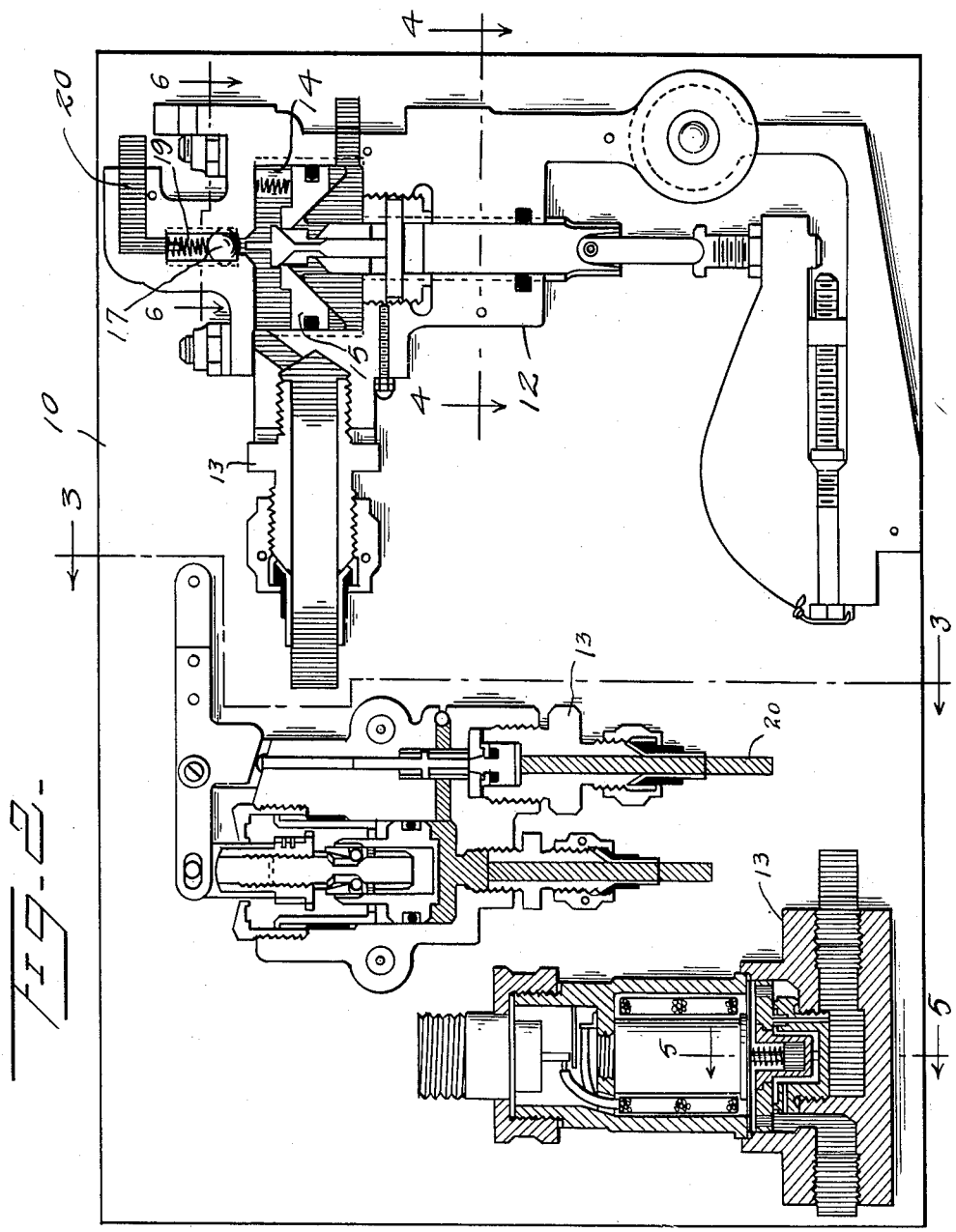
Inventor
John H. Koch
By
Kimmel & Crowell Attorneys

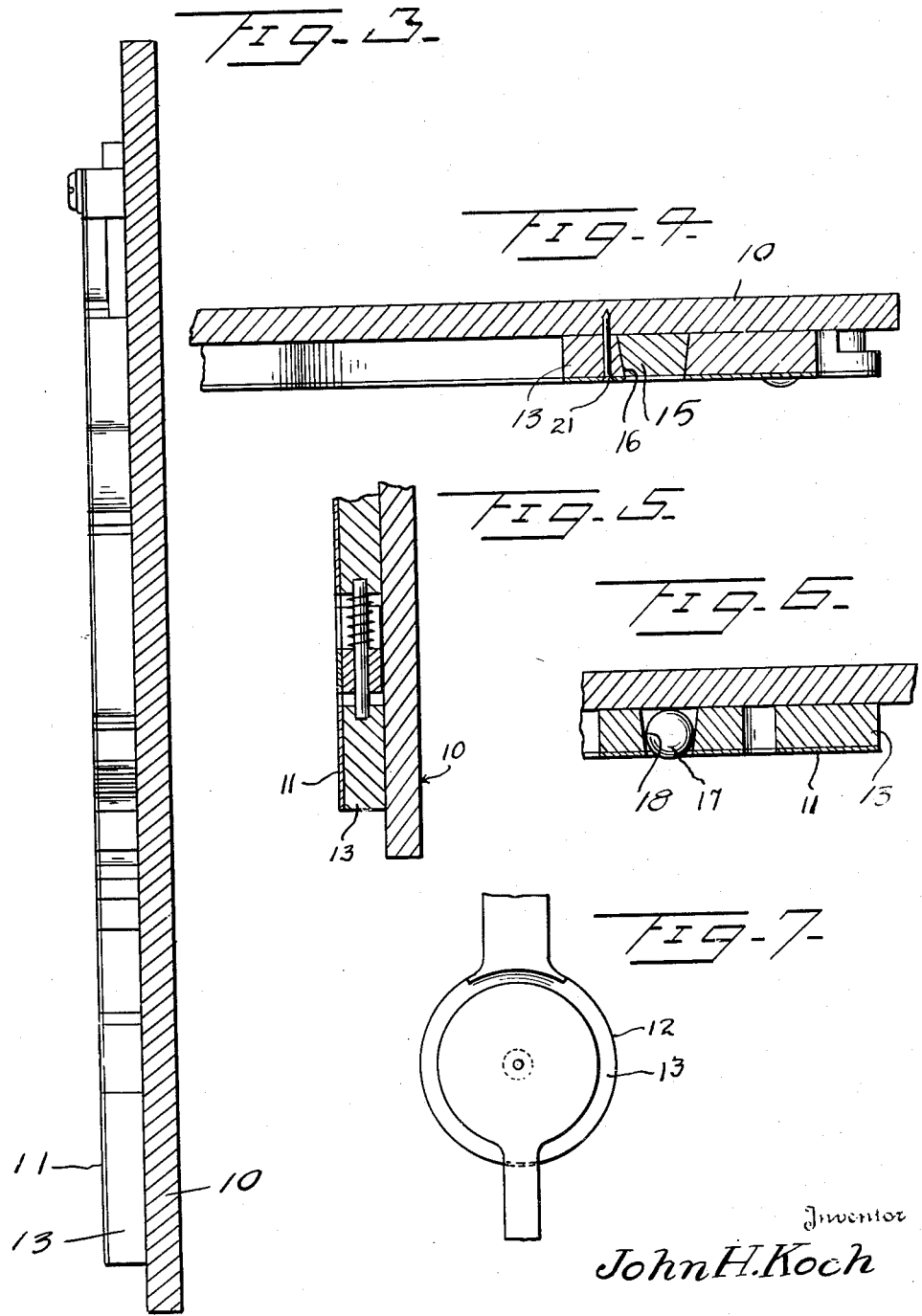

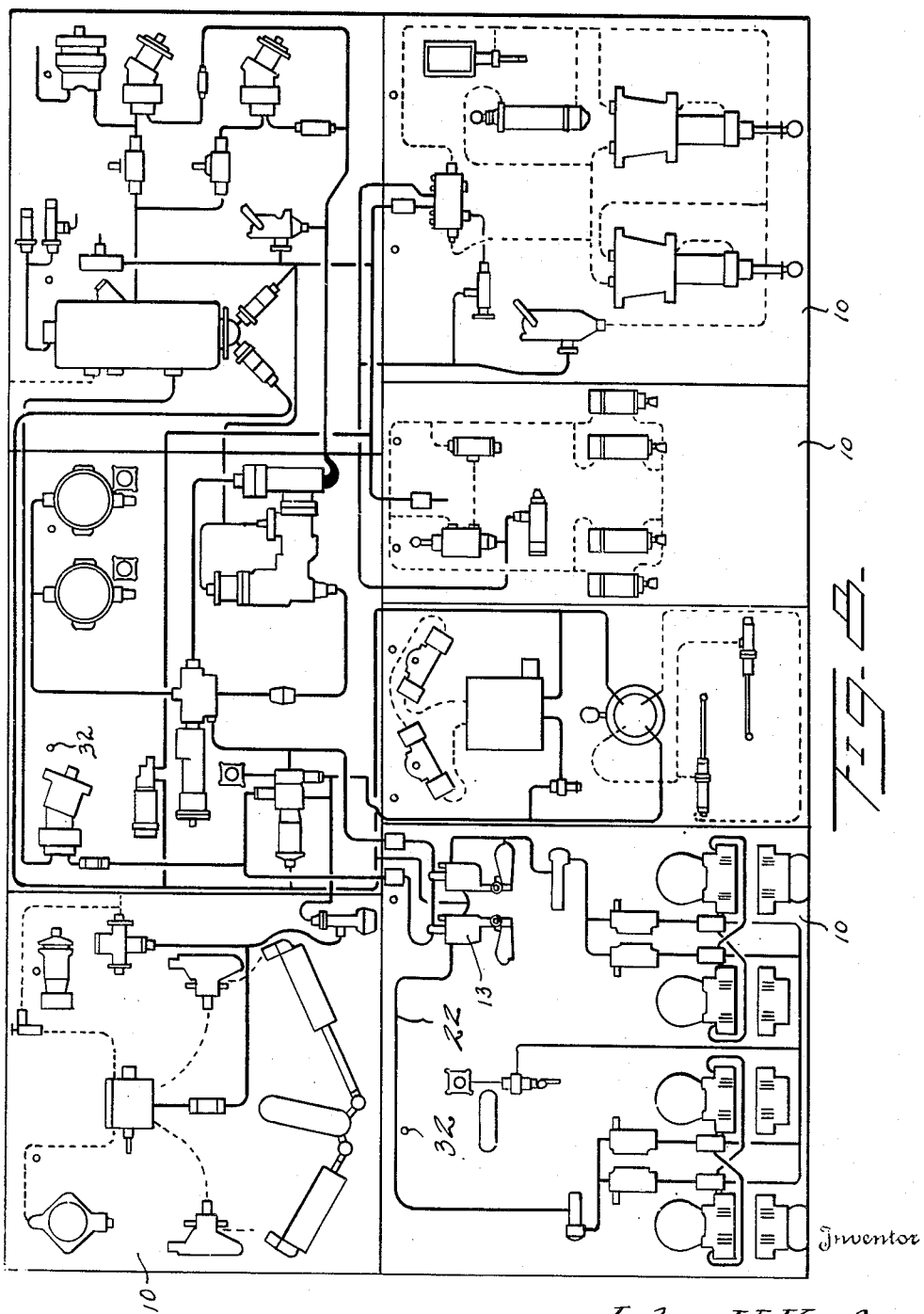

Patented Dec. 6, 1949

2,490,690

UNITED STATES PATENT OFFICE 2,490,690

METHOD FOR CONSTRUCTING TRAINING MOCK-UP

John H. Koch, Tulsa, Okla.

Application June 14, 1948, Serial No. 32,912

2 Claims. (Cl. 35—1)

This invention relates to a system and means for instruction and/or presentation for mechanical and/or electrical devices.

In the instruction of students, workers, technicians, sales personnel and the like on the mechanical details and operation of machine parts, it is customary to draw the various parts on a large sheet of paper with certain parts in section and other parts in elevation, and connecting associated parts or elements together by colored ribbon-like lines representing pipe lines for conducting fluid from one part to another. This system of instruction does not thoroughly teach the student the physical characteristics of the elements together with the operative relations of the parts one to another.

It is, therefore, an object of this invention to provide an improved system and means of instruction-presentation wherein the complete system under study is picturized from mechanical drawings showing the assembled parts, and each drawing part is fixed to a board with the board cut around the marginal edges of the parts so that the cut-out parts can be secured to a panel board and the latter mounted on an easel stand.

It is, therefore, an object of this invention to provide an improved system and means of instruction and/or presentation wherein using reproductions of valves, etc., retouched and/or redrawn to emphasize certain instructional or sales points. Attaching said prints (ozalid blue prints, photographs, etc.) to proper backing described further herein and thus make possible detailed instructions and/or presentation of systems, section or assembly parts alone or in plural to provide a good training and/or demonstrator at a fraction of the time and cost now used to accomplish this through other means.

Another object of this invention is to provide an improved system and means of instruction and/or presentation wherein the various mechanical elements or parts are disposed in relief on a base panel, and where the element embodies movable parts, such movable parts are cut from the element so as to be capable of being moved, and preferably the movable connection of the movable part with the associated stationary or movable part, is dovetailed so that the movable part or parts will not drop off of the panel.

Another object of this invention is to provide an improved system and means of instruction and/or presentation wherein flows (fluids and/or electrical) be controlled by the instructor and/or demonstrator so as the movable part and/or parts can be moved to change and make possible detailed flows etc., to, through and from each and every valve, lever, etc., used on a panel or a series of panels.

It is, of course, well known that various methods and means have been used in mock-up systems, one such being using the actual machined elements and cutting or splitting the elements so that the inner working parts may be viewed. While this system, that is using the physical elements themselves, is a fair method of instruction, it is nevertheless an expensive system even though the elements used may be discarded or otherwise non-usable elements. The availability, cost and technical skill necessary to make over the parts plus the fact that the parts can not be enlarged if too small or reduced if too large (for transporting, practical shop and classroom purposes) make it a relatively poor mock-up, considering the above.

Still another system embodies the drawing of the elements on a blackboard, but in this system the instructor must have an artistic background, and where there are operational features to be illustrated each movement must be drawn with the positions of the correlated and connected parts re-drawn in their new position.

With a system as embodied in this invention, the operational parts are made movable and the correlated parts may be moved to their proper positions so that the student can clearly visualize every part and the effect of movement of one part upon an adjacent or correlated part or parts. Where a substantially involved system is being studied the complete system is formed on separable panels with each panel forming one subject, and as the studies progress the studied panels are placed on an easel or stand, so that when all of the panels are studied the complete systems will be disclosed on the stand.

With the above and other objects in view, my invention consists in the arrangement, combination and details of construction disclosed in the drawings and specification, and then more particularly pointed out in the appended claims.

In the drawings,

Figure 1 is a perspective view of an easel or stand constructed according to an embodiment of this invention and designed particularly for supporting the mock-up system embodying this invention, Figure 2 is a detail front elevation of one panel designed according to this system, Figure 3 is a sectional view taken on the line 3—3 of Figure 2, Figure 4 is a fragmentary sectional view taken on the line 4—4 of Figure 2, Figure 5 is a fragmentary sectional view taken on the line 5—5 of Figure 2, Figure 6 is a fragmentary sectional view taken on the line 6—6 of Figure 2, Figure 7 is a fragmentary front elevation of one of the operating elements shown in Figure 2; and Figure 8 is a detail front elevation of the complete mock-up system.

In the formation of a mock-up system a plurality of panels 10 which may be formed of plywood or the like have secured to the forward side thereof mechanical drawings which may pictorially—actually instruct students-purchasers in the mechanical—electrical details of the apparatus involved. In the present system the mechanical and/or electrical drawings designated 11 are secured to a panel board and this board is then cut out around the marginal edges 12 of the mechanical part so that the part pictorially disclosed by the drawing 11 will be shown in relief when the panel 13 is secured to the base panel 10.

The panel 13 which is now cut out around the marginal edges thereof may also be cut out on certain inner portions thereof as indicated at 14 so that movable parts 15 may be moved relative to the stationary parts. In cutting out the movable parts 15, the panel 13 is under-cut as indicated at 16, so that the movable part 15 will be dovetailed to the stationary part 13. In this manner the movable part 15 will not fall off the base panel 10 when this panel is in a substantially upright or inclined position.

In Figure 2 there is disclosed a cut-out assembly which includes a spring-pressed check valve 17 in the form of a ball. The ball 17 is a steel ball which is inserted in the under-cut portion (Fig. 6) 18 of the panel 13. A spring 19 is interposed between the ball 17 and the upper end of the passage which forms the check valve chamber. The drawing 11 embodying the assembly is glued or otherwise firmly secured to the panel 13 and this drawing when cut out around the marginal portions thereof is then colored as indicated at 20, to indicate fluid ducts, and also colored with differential colors to indicate various passages, seals and the like.

The cut-out assembly may be secured by nails or other fastening means 21 to the base panel 10 and as shown in Figure 8, the various cut-out assemblies are shown as connected together by means of relatively wide colored lines 22 which indicate pipe lines or the like. These pipe lines may be differentially colored so as to indicate the direction of flow of the material or for other purposes.

After the desired assemblies have been cut out and secured to the base panels 10, these panels are suspendingly mounted on the easel shown in Figure 1 and generally designated as 23. The easel 23 includes a pair of front legs 24 and a pair of rear legs 25 which are hingedly secured to the upper ends of the front legs 24 as indicated at 26. A rectangular frame 27 is secured to the front legs 24 and includes upright bars 28 which have secured thereto upper and lower horizontal bars 29 and 30 respectively. The upper bar 29 has secured thereto a plurality of spaced apart pegs or pins 31 which are engageable through holes 32 formed in the panels 10. The frame 27 also includes an intermediate horizontal bar 32 having pegs or pins 33 so that the lower panels may be mounted on the frame with the lower edges or ends of the upper panels engaging against the intermediate bar 32 and the lower panels which are suspended from the pegs or pins 33 resting against the lower bar 30.

The legs 25 are held in rearwardly extended operative position by means of bars 34 carried by eyes 35 fixed to the legs 25. The free ends of the bars 34 are adapted to engage in sockets 36 formed in the rear sides of the front legs 24. A chain or flexible member 37 is connected between the front and rear legs and is adapted to be held taut when the bar 34 is engaged in the socket or recess 36.

In the use of this system each of the panels 10 is initially made up with the mechanical elements depicted by the mechanical drawing which is cut out and in a number of the mechanical elements the movable inner parts are cut out, being under cut as hereinbefore described, so that they may be moved and at the same time will be held against dropping from the base panel 10.

The various pipe lines, connecting rods, cables, wiring or the like which extend from one base panel to another, are suitably colored and are so arranged that when these base panels are mounted on the easel or stand, the pipes or other connecting parts will register so that the complete system depicted by the panels will be shown as indicated in Figure 8. Preferably in the instruction or demonstration of the system involved, the instruction will begin with one base panel 10 and the mechanical parts or elements embodied on such panel, the panel being suspended or set up on the easel so that it may be readily viewed by the students or purchaser. After one panel has been thoroughly studied, an adjacent panel is set up until the complete system is depicted by the edge abutting panels.

With a mock-up system as hereinbefore described, the student or purchaser will be able to visually determine the inner working parts of the mechanical elements and the operative relation of such working parts on associated parts. The cut out panels may be cut out by a jig saw or other suitable means and then either glued, nailed or otherwise secured to the base panel in a selected position closely simulating the position of the particular element with respect to adjacent elements. This mock-up system can be produced at relatively low cost in view of the fact that the mechanical drawings prepared for the particular mechanical elements may be used in the showing of the mechanical parts, the drawings being glued or otherwise firmly fastened to the cut-out panel and then the part being cut from the panel around the marginal portions of the mechanical element with the inner working parts under cut as hereinbefore described.

It is understood that the phrase "mechanical elements" as used herein and embodied in the claims shall include both mechanical and electrical elements, together with electric circuits associated with such electrical elements.

I do not mean to confine myself to the exact details of construction herein disclosed, but claim all variations falling within the purview of the appended claims

What I claim is—

1. The method of constructing a mock-up board for illustration of mechanical elements and their operation which includes securing a drawing of the elements onto a flat board, cutting the board around the marginal edges of the elements and within selected portions of the elements, bodily cutting movable portions of the elements with an under-cut, and securing the elements onto a panel with the movable portions loose.

2. A mock-up board for the illustration of mechanical elements and their operation, comprising a flat supporting panel, a drawing of the elements to be illustrated, said drawing being secured on a flat board, the marginal edges of said board and said drawing being cut to conform to the outlines of the elements, selected portions of said board and the overlying portions of said drawing being severed from the remainder thereof to provide movable portions of the elements to be illustrated, the edges of said movable portions and the confronting edges of the remainder of said board being undercut to provide interlocking slidable engagement therebetween, and said remainder of said board being fixedly secured on said supporting panel.

JOHN H. KOCH.

REFERENCES CITED

The following references are of record in the file of this patent:

UNITED STATES PATENTS

| Number | Name | Date |
| --- | --- | --- |
| 392,565 | Larew | Nov. 6, 1888 |
| 663,236 | Lofy et al. | Dec. 4, 1900 |
| 1,722,659 | Clark | July 30, 1929 |
| 2,095,046 | Wilner | Oct. 5, 1937 |
| 2,127,494 | Tepper | Aug. 23, 1938 |
| 2,245,110 | Marcaccio | June 10, 1941 |
| 2,443,468 | Madden | June 15, 1948 |